(12) United States Patent
De Maagt et al.

(10) Patent No.: US 7,460,063 B2
(45) Date of Patent: Dec. 2, 2008

(54) INTERFEROMETRIC RADIOMETER

(75) Inventors: Peter De Maagt, Katwijk (NL); Jacob Björn Christensen, Kungsbacka (SE); Anders Carlström, Mölnlycke (SE); Anders Johan Gunnar Emrich, Askim (SE); John Stefan Back Andersson, Torslanda (SE)

(73) Assignee: Agence Spatiale Europeenne, Paris (FR)

( * ) Notice: Subject to any disclaimer, the term of this patent is extended or adjusted under 35 U.S.C. 154(b) by 0 days.

(21) Appl. No.: 11/812,103

(22) Filed: Jun. 15, 2007

(65) Prior Publication Data
US 2008/0007451 A1 Jan. 10, 2008

(30) Foreign Application Priority Data
Jun. 16, 2006 (FR) .................................. 06 05371

(51) Int. Cl.
*G01S 3/02* (2006.01)
(52) U.S. Cl. ...................................................... 342/351
(58) Field of Classification Search ................ 342/351, 342/353, 369, 371; 701/207, 213
See application file for complete search history.

(56) References Cited

U.S. PATENT DOCUMENTS

| | | | |
|---|---|---|---|
| 4,654,666 A * | 3/1987 | Wiley ........................ | 342/351 |
| 4,724,439 A | 2/1988 | Wiley et al. | |
| 5,231,404 A * | 7/1993 | Gasiewski ................. | 342/351 |
| 5,552,605 A * | 9/1996 | Arata ...................... | 250/363.04 |
| 7,084,405 B1 * | 8/2006 | Malyutenko et al. ... | 250/370.08 |
| 2008/0042067 A1 * | 2/2008 | Rousso et al. .......... | 250/363.04 |

FOREIGN PATENT DOCUMENTS

FR 2 788 133 7/2000

OTHER PUBLICATIONS

M. Martin-Neira et al., "MIRAS—A Two-Dimensional Aperture-Synthesis Radiometer for Soil-Moisture and Ocean-Salinity Observations", ESA Bulletin, 92, Nov. 1997, pp. 95-104.
M. Martin-Neira et al., "MIRAS, a Two-Dimensional Aperture Synthesis Radiometer", GeoScience and Remote Sensing Symposium, Surface and Atmospheric Remote Sensing: Technologies, Data Analysis and Interpretation, International, Pasadena, CA, Aug. 8-12, 1994, XP010138556.

(Continued)

*Primary Examiner*—Dao L Phan
(74) *Attorney, Agent, or Firm*—Clark & Brody

(57) ABSTRACT

A space-borne interferometric radiometer for imaging a radiation emission from a target scene (ED), comprising a plurality of receiving elements arranged in a two- or three-dimensional array (REA), a first signal processor (SP1) for computing a two-dimensional set of samples of a visibility function by pair-wise cross-correlating signals received by the receiving elements; and second signal processor (SP2) for reconstructing an image from the samples of the visibility function. The radiometer is further characterized in that it has the ability for rotating the two- or three-dimensional array (REA) about a rotation axis (z) which is substantially directed toward the target scene (ED) and in that the second signal processor (SP2) is adapted for reconstructing the image from a plurality of two-dimensional sets of samples of the visibility function corresponding to different rotational positions of the rotating two- or three-dimensional array (REA) of receiving elements.

27 Claims, 3 Drawing Sheets

OTHER PUBLICATIONS

Figure 1:
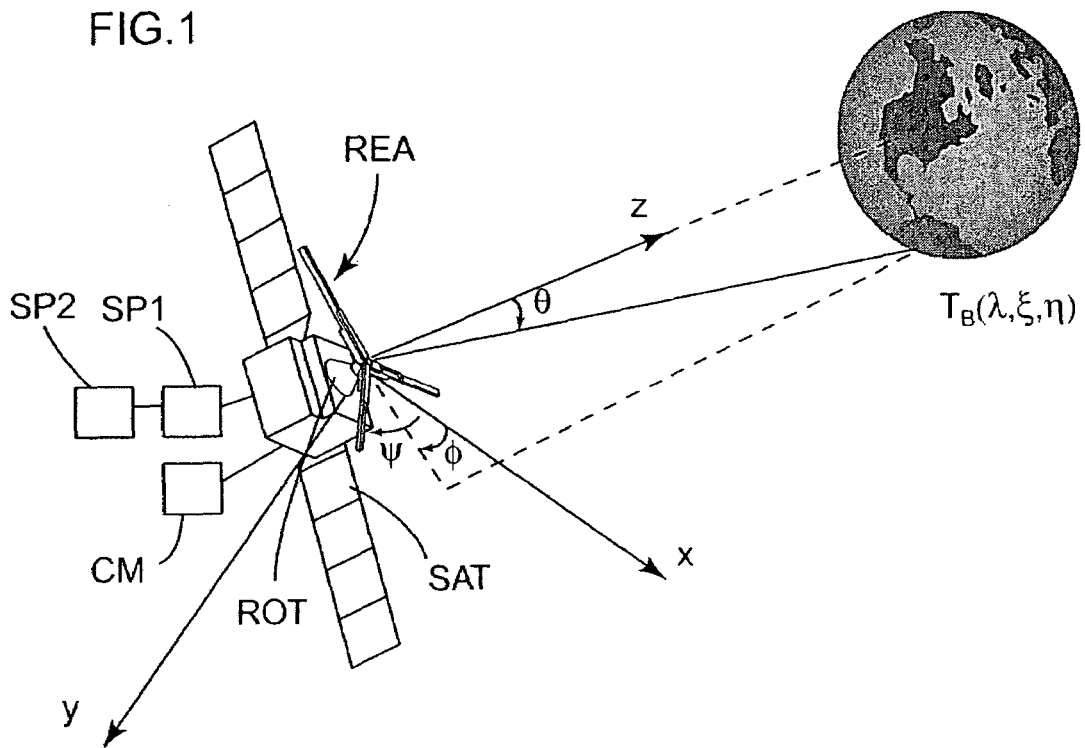

B. Lambrigtsen et al., "GeoSTAR—A Microwave Sounder for Geostationary Satellites", GeoScience and Remote Sensing Symposium, Proceedings, 2004 IEEE International, Anchorage, AK, Sep. 20, 2004, XP010751002.

H. Stankwitz et al., "Advances in Non-Linear Apodization for Irregularly Shaped and Sparse Two Dimensional Apertures", Radar Conference, 2005 IEEE International, Arlington, VA, May 9-12, 2005, XP01081774.

B. Lambrigtsen et al., "GeoSTAR—A Microwave Sounder for GOES-R", 14th International TOVS Study Conference, Beijing, PR China, May 25-31, 2005.

B. Lambrigtsen et al., "GeoSTAR—A Synthetic Aperture Approach for a Geostationary Microwave Sounder", 2004 IEEE Aerospace Conference Proceedings, Big Sky, MT, Mar. 6-13, 2004.

A. Carmona, "Application of Interferometric Radiometry to Earth Observation", Doctoral Thesis, Universitat Politecnica de Catalunya, Barcelona, Spain, 1996.

* cited by examiner

INTERFEROMETRIC RADIOMETER

The invention relates to an interferometric radiometer for imaging a radiation emission from a target scene.

More particularly, but without being limited to this specific application, the invention relates to a space-borne interferometric radiometer for imaging a radiation emission from a planetary surface. The radiometer of the invention is particularly well-suited for imaging the Earth in the microwaves and especially in the millimeter or sub-millimeter waves from a geostationary orbit.

The term "planetary surface" should be intended in a broad sense, so as to include not only the surfaces of Earth-like and gaseous planets, but also those of satellites, asteroids, comets, etc.

Space-borne microwave radiometers complement optical imaging in the visible and in the infrared by providing vertical profiles of temperature and humidity through the atmosphere, even in the presence of clouds, as well as information on precipitations. Often, radiometers operate in nadir viewing mode; they perform passive measurements and are able to discriminate between radiations coming from different levels in the atmosphere by observing the spectral broadening of emission lines.

Current generations of radiometers are embarked on low-Earth orbit (LEO) satellites, orbiting at an altitude comprised between ca. 300 and 900 km. Due to the comparatively low altitude of these satellites, a satisfactory spatial resolution of a few tens of kilometers can be achieved around the nadir in the 50-100 GHz spectral domain by using a single antenna with a diameter of the order of 1 m or less. It is reminded that the Rayleigh criterion for spatial resolution in nadir viewing is:

$$r \approx \frac{1.22\lambda}{D} R \quad [1]$$

where r is the resolving power (size of the smallest resolved spatial feature), $\lambda$ the radiation wavelength, D the antenna diameter and R the antenna-ground distance. For off-nadir viewing, spatial resolution is greatly degraded.

LEO radiometers have a measurement swath of the order of 2000 km and achieve a global coverage of the Earth surface thanks to their orbital movement. As a consequence, these instruments cannot provide continuous coverage of the same region of the Earth: typically their revisit time is of the order of 2-3 days. Therefore, LEO radiometers have a good spatial resolution but a poor temporal resolution.

A much better temporal resolution, ideally continuous monitoring, is required in order to follow in real time the evolution of meteorologically interesting scenes, such as hurricanes approaching a shoreline or storm formation ("nowcasting"). This can only be achieved by mounting a radiometer on a geostationary (GEO) satellite, orbiting at an altitude of about 36000 km. However, due to the greatly increased Earth-instrument distance, an antenna of an impractical size would be required to achieve a spatial resolution similar to that of LEO radiometers. For example, to achieve a linear resolution of 30 km (corresponding to an angular resolution of less than 1 milliradian) at 50 GHz, a reflector with a diameter of 8 m with a surface roughness below 0.1 mm would be necessary. At present, it is not possible to launch and deploy an antenna with this size and surface accuracy in GEO orbit. Therefore, prior art does not allow imaging the Earth in the microwaves from a GEO orbit with a satisfactory spatial resolution.

In order to circumvent this problem, the NASA is developing an on-ground demonstrator for a 50-GHz radiometer (GeoSTAR) based on the interferometric or aperture-synthesis principle. This concept is described in the paper "A Microwave Sounder for GOES-R: A GeoSTAR Progress Report", B. H. Lambrigtsen, P. P. Kangaslahti, A. B. Tanner and W. J. Wilson, 14th International TOVS Study Conference Beijing, P. R. China; May 25-31, 2005.

The proposed GeoSTAR radiometer consists of a Y-shaped array of microwave receivers which are operated in I/Q heterodyne mode, with all of the antennas pointed in the same direction. A digital subsystem computes cross-correlations between the frequency-converted signals of all possible pairs of receivers; that way, each correlator and the associated antenna pair form an interferometer. The complex cross-correlation signal, expressed as a function of the spacing between antennas ("baseline"), is known as "visibility function" and is essentially the Fourier transform of the brightness of the observed scene, expressed as a function of the incidence angle. An image can then be reconstructed by computing the inverse Fourier transform of the visibility function. The Y-array leads to a sampling of the two-dimensional spatial frequency domain (known as the u-v plane) following a hexagonal grid, and the number of samples is of the order of $N \cdot (N-1)$, where N is the number of individual antennas.

According to the Nyquist sampling criterion, the unambiguous field of view is determined by the minimum spacing between antennas pairs. For full Earth coverage, this field of view must be larger than the Earth disc angular diameter as seen from a GEO orbit, approximately 17.5°. This sets the maximum spacing between receiving elements to about 3.5 wavelengths, i.e. 2.1 cm at 50 GHz. In practice, this leads to a close-packed arrangement of receiving antennas mounted edge-to-edge. This means that in such a prior art system there is a direct relationship between the resolving power, which sets the length of the longest baseline, and therefore the length of the arms of the Y-array, and the number of receiving elements on each arm. For example, to achieve a spatial resolution of 30 km at 50 GHz, a baseline of 8 meters is required; this correspond to approximately 200 receivers per arm, or a total of 600 receivers.

The sampling criterion can be relaxed if a smaller field of view is required, e.g. if only a limited area of the Earth surface has to be imaged.

Therefore, the proposed synthetic aperture radiometer concept leads to a large number of receivers, and therefore to an impractical mass and a high power consumption. There are also other significant drawbacks in this prior art concept.

First of all, calibration in amplitude and phase of such a large number of receivers is a daunting challenge.

Another drawback is that the receiving pattern of the synthesized aperture shows strong sidelobes, except if a weighting function is applied in order to shape the beam. Since the Nyquist criterion imposes a nearly close-packed arrangement of antennas on the arms of the array, the instrument designer has no freedom to modify the geometrical distribution of sampling points in the u-v plane in order to improve the shape of the synthesized receiving pattern.

Another drawback is the fact that sensitivity, spatial resolution and field-of-view requirements cannot be fulfilled independently, but are closely linked. It is therefore difficult to achieve a satisfactory tradeoff between these requirements.

Still another drawback is the fact that the radiometer, due to the current antenna type and geometrical layout, can only work in a single band. Due to the large number of elements required even for single-band operation and to their close-packed arrangement, multi-band operation is very difficult to achieve.

The invention aims at solving at least some of the problems mentioned above, in order to provide a radiometer well-suited for imaging the Earth microwaves, and more particularly in the millimeter and sub-millimeter waves from a geostationary orbit. "Millimeter and sub-millimeter waves" approximately correspond to a frequency comprised between 30 GHz and 3 THZ, but the invention can be carried out in a broader frequency range, e.g. from about 1 GHz to 10 THz.

According to the invention, this objective is achieved by an interferometric radiometer comprising a sparse array of receiving elements which is rotated around an axis directed toward the observed scene. Rotation allows achieving a satisfactory sampling of the u-v plane even without the need of a full array of edge-to-edge mounted elements. While at each time instant the Nyquist criterion is not satisfied, the aperture is fully sampled during half a revolution. This leads to a dramatic reduction of the number of receiving elements, e.g. by a factor of 4 to 6 in the examples reported later, which makes high-resolution Earth imaging from a GEO orbit feasible. Moreover, since close-packing of the receivers is no longer required, the spatial distribution of samples in the u-v plane can be carefully optimized in order to reduce the side-lobes of the receiving patterns of the synthesized aperture. Use of a sparse array of detectors also makes multi-band imaging possible. Another significant advantage of the invention is that rotation of the array significantly helps calibration.

It should be noted that the rotational sampling principle is particularly well-suited for imaging the Earth from a GEO orbit, because the instrument is stationary with respect to the observed scene. Imaging from a LEO orbit would still be possible, but is complicated by the need of taking into account the relative movement of the radiometer-carrying satellite with respect to the ground.

More precisely, an object of the invention is an interferometric radiometer for imaging a radiation emission from a target scene, comprising:
- a plurality of receiving elements for receiving said radiation, said receiving elements being arranged in a two- or three-dimensional array;
- first signal processing means for computing a two- or three-dimensional set of samples of a visibility function of said radiation emission by pair-wise cross-correlating signals received by said receiving elements; and
- second signal processing means for reconstructing an intensity image of said radiation emission from said samples of said visibility function;
- characterized in that it further comprises means for rotating said two- or three-dimensional array of receiving elements about a rotation axis which is substantially directed toward said target scene;
and in that said second signal processing means are adapted for reconstructing said intensity image from a plurality of two-dimensional sets of samples of said visibility function, each of said set of samples corresponding to a different rotational position of said rotating two- or three-dimensional array of receiving elements.

More precisely, an object of the invention is a space-borne interferometer adapted for imaging a planetary surface.

According to particular embodiments of the inventions:

Said array of receiving elements can be substantially bi-dimensional and perpendicular to said rotation axis.

The spacings between said receiving elements can be chosen in such a way that they are not constant, nor are integer multiples of a minimum spacing. In particular, the arrangement of said receiving elements can be chosen such as to determine a non-uniform distribution of said samples of said visibility function in a two-dimensional spatial frequency domain, ensuring that the secondary lobes of a synthesized receiving pattern of said interferometric radiometer have a normalized amplitude of −20 dB or less, and preferably of −40 dB or less. Advantageously, the distribution of said samples of said visibility function in a two-dimensional spatial frequency domain approach an apodization function chosen between a Gaussian function, a cosine, a Hamming window and a Hanning window.

Said means for rotating said two- or three-dimensional array can be adapted for operating at a rotational speed comprised between 0.001 and 100 rpm, in particular between 0.01 and 10 rpm and preferably between 0.1 and 1 rpm.

Said receiving elements can be adapted for receiving electromagnetic radiation in at least a frequency band lying in the 1 GHz-10 THz, or more particularly in the 30 GHz-400 GHz spectral range.

The width of said two-dimensional array of receiving elements perpendicularly to said rotation axis is advantageously sufficient for providing an angular resolution of the reconstructed intensity image of 7 milliradians or less, and preferably of 1 milliradian or less, at least in said frequency band.

Moreover, the number and the arrangement of said receiving elements is advantageously such that, after half a turn of the rotating two-dimensional array, the resulting sampling density of said visibility function is sufficient for providing an unambiguous field of view having a full width of 17° or more, at least in said frequency band.

Advantageously, the rotation axis can pass substantially through the center of inertia of said rotating two- or three-dimensional array of receiving element.

Said receiving elements can be aligned along a plurality of linear arms. In particular, the interferometric radiometer can comprise three linear arms angularly spaced by 120° with respect to each other so as to form a Y-shaped array, said rotation axis passing through the center of said array.

The number and the spacing of the receiving elements on said linear arms is advantageously the same.

Said first signal processing means can advantageously be adapted for introducing a plurality of relative time delays between said received signals to be cross-correlated and for computing delay-dependent visibility functions, said second signal processing means being adapted for reconstructing a multi-spectral image of said radiation emission by Fourier-transforming said delay-dependent visibility functions.

The interferometric radiometer of the invention can further comprise relative phase and/or amplitude calibration means, adapted for comparing the sets of samples of said visibility function corresponding to different rotational positions of said rotating array of receiving elements and retrieving relative phase and/or amplitude calibration information by said comparison. In particular, said calibration means can be adapted for comparing sets of samples of said visibility function corresponding to rotational positions differing by half a turn. In the case the rotating array of receiving elements has, at least approximately, a discrete rotational symmetry (e.g. a 60° rotational symmetry), said calibration means can be adapted for comparing sets of samples of said visibility function corresponding to rotational positions differing by an angle corresponding to said discrete rotational symmetry.

The receiving elements can be adapted for distinguishing between two polarization components of the received radiation, and said second signal processing means can be adapted for reconstructing two intensity images corresponding to different polarization components of said radiation emission. In particular, said second signal processing means can be adapted for computing the Stokes parameters of the received radiation.

A multi-band interferometric radiometer can comprise a plurality of individual interferometric radiometers as described above, the two- or three-dimensional arrays of receiving elements of which are mounted on a common rotating structure, each of said individual interferometric radiometers being adapted to operate in a different spectral band.

In an advantageous embodiment, each of said individual interferometric radiometers comprises a plurality of linear arms along which are aligned the corresponding receiving elements, the linear arms of said individual interferometric radiometers being parallel to each other.

Figure 2:
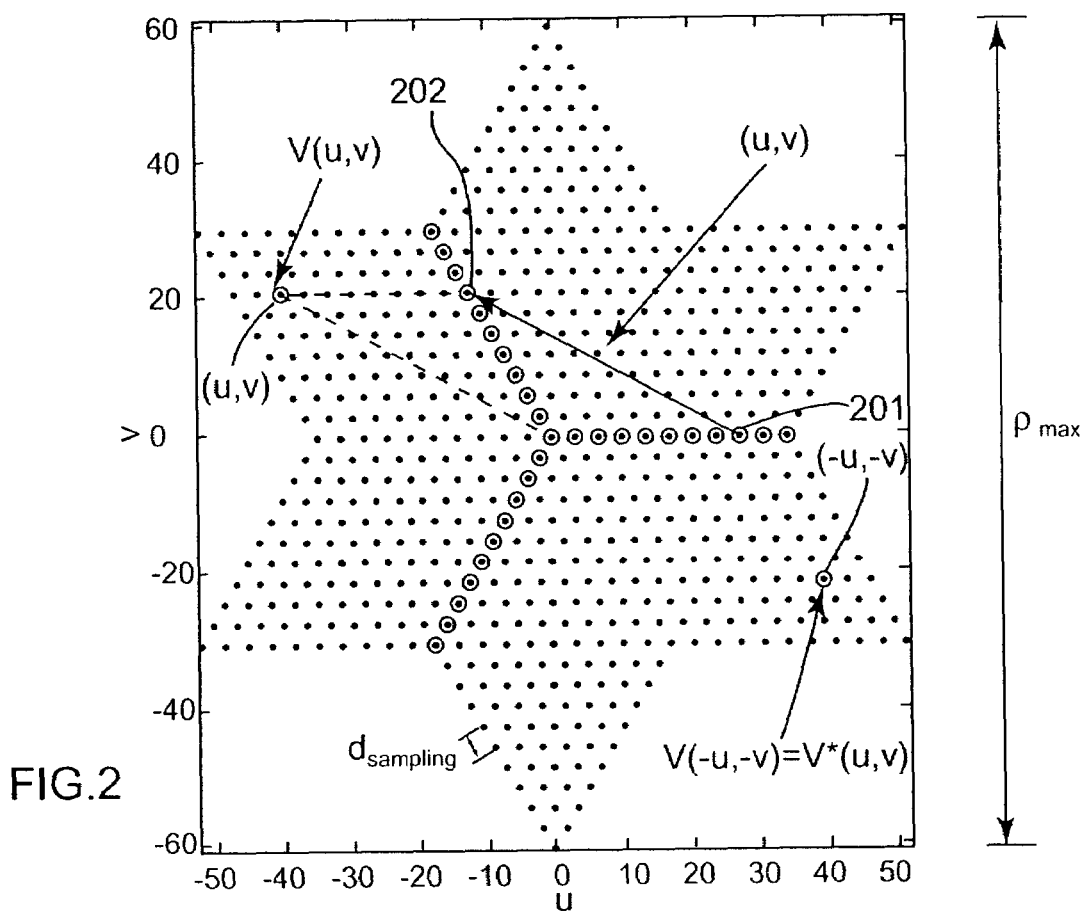
Figure 3:
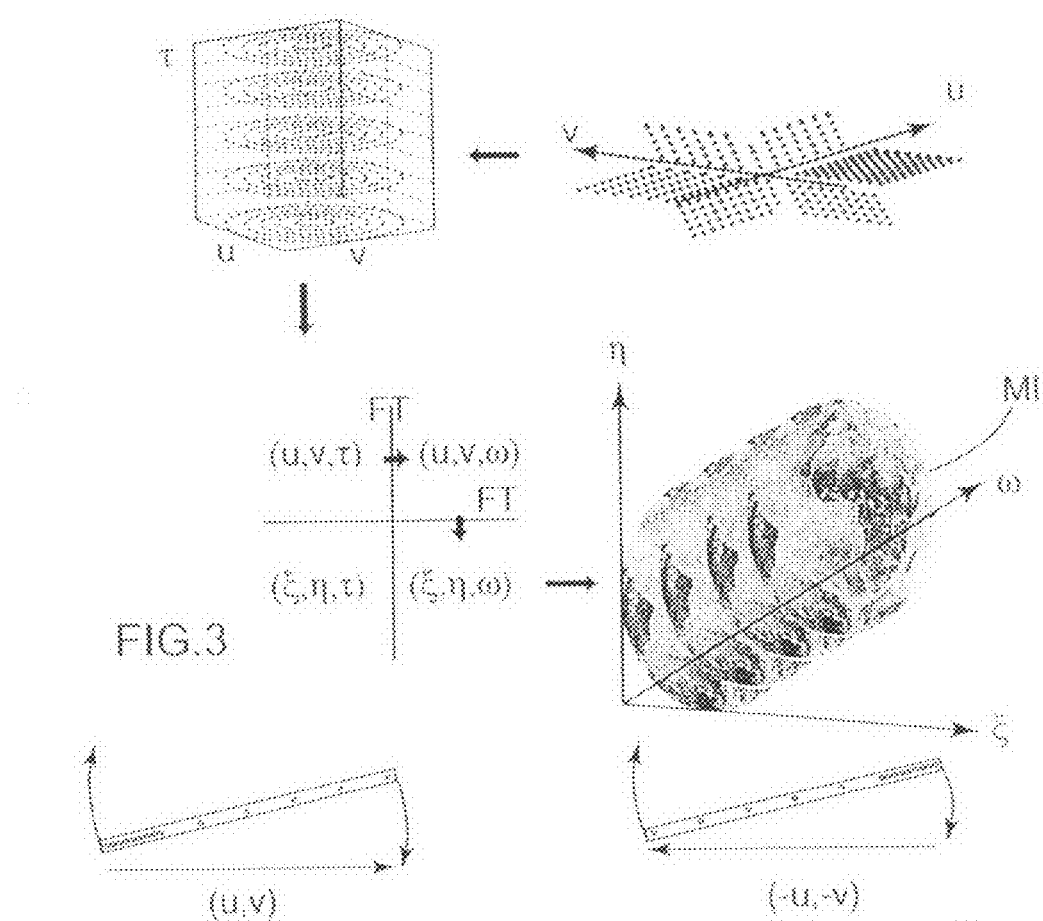
Figure 5:
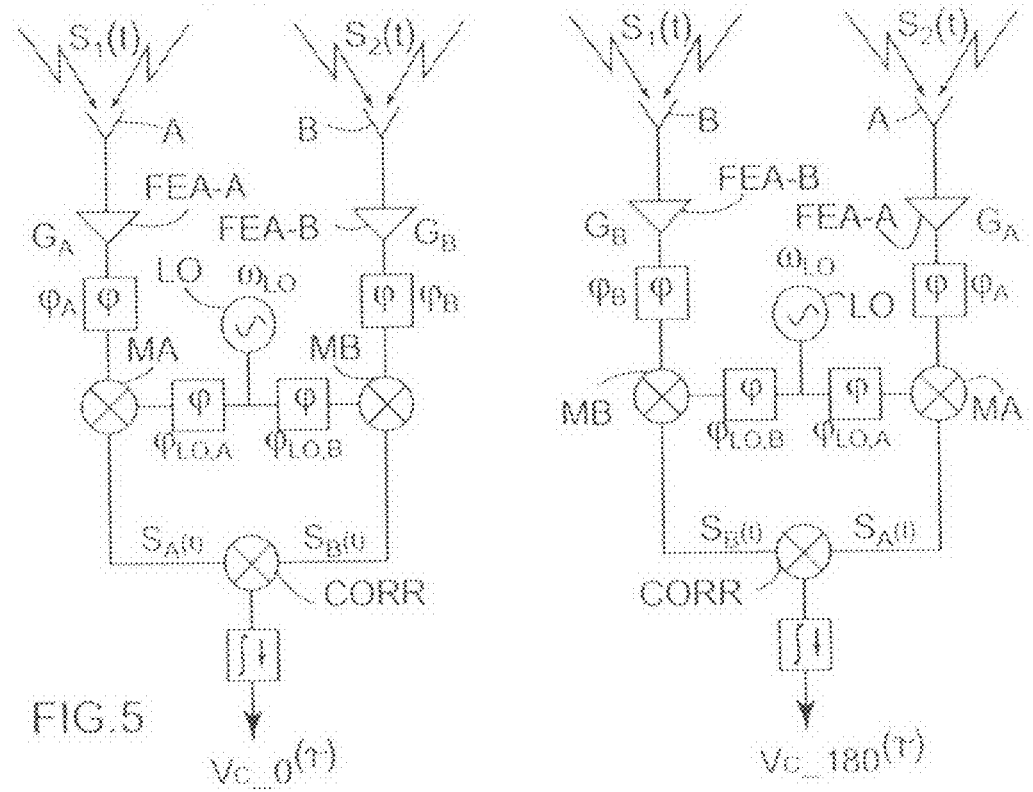
Figure 4A:
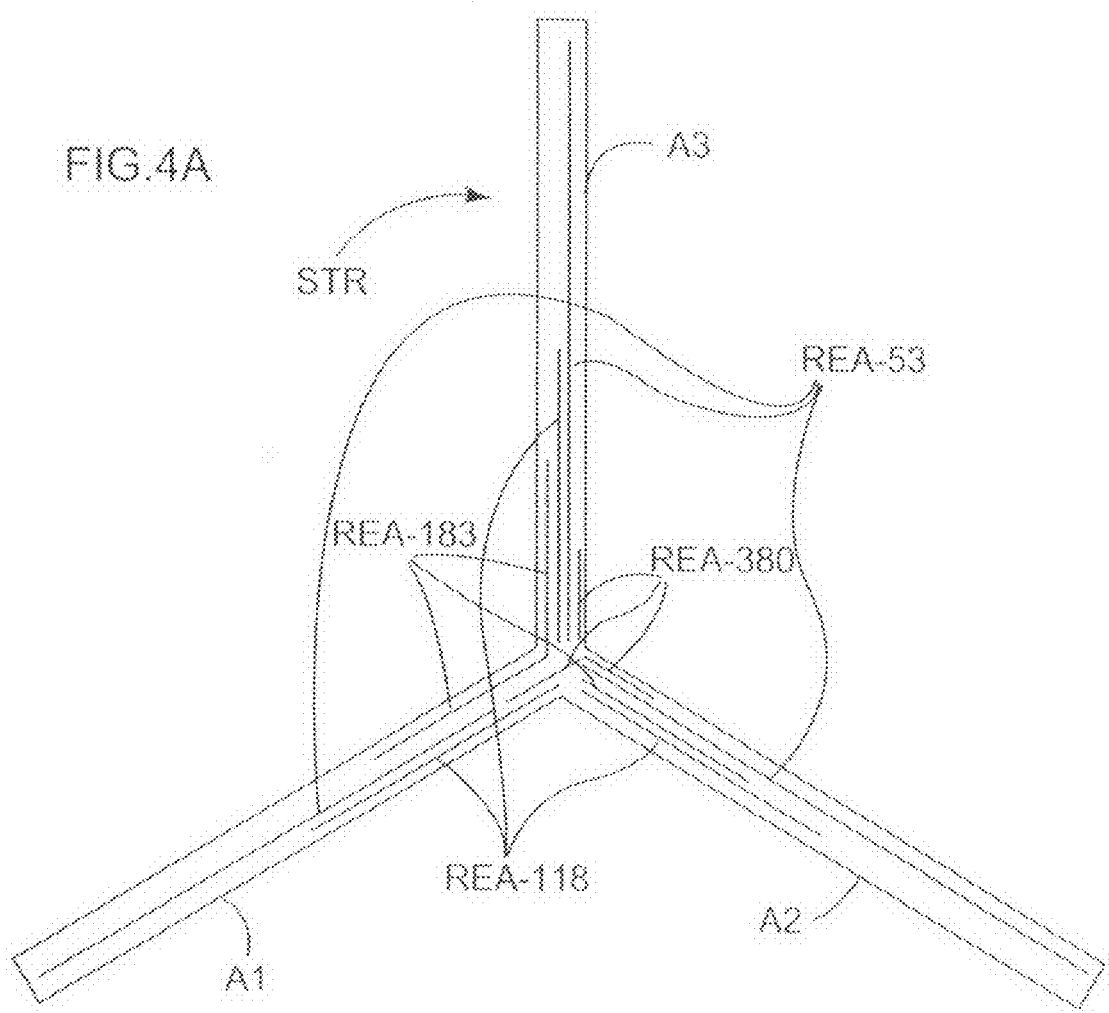
Figure 4B:
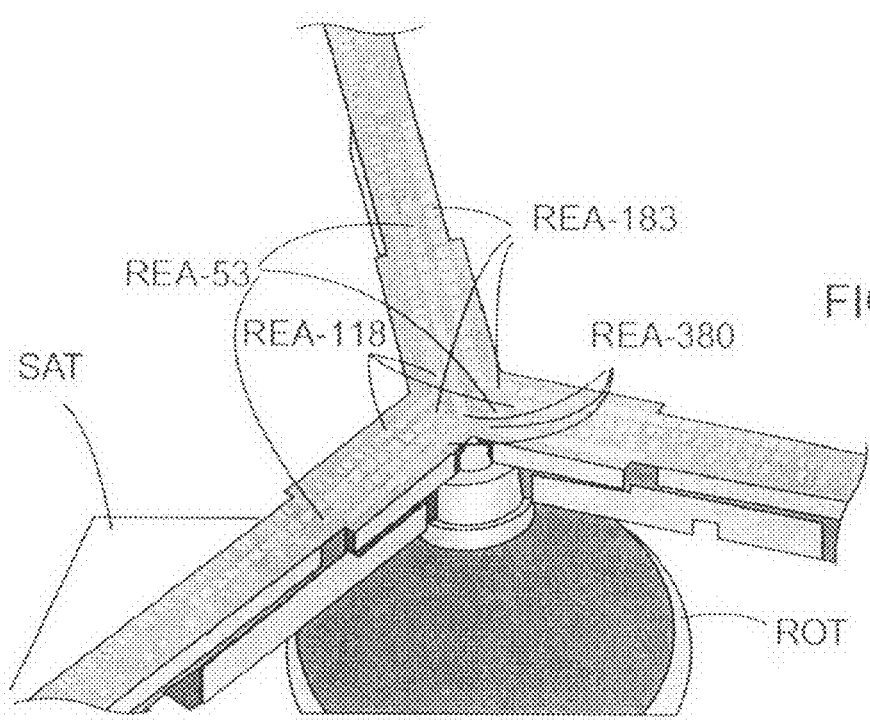

Additional features and advantages of the present invention will become apparent from the subsequent description, taken in conjunction with the accompanying drawings, which show:

FIG. 1, a schematic illustration of an interferometric radiometer according to the present invention;

FIG. 2, the principle of interferometric radiometry with a stationary Y-shaped array of receiving elements, known from prior art;

FIG. 3, an illustration of the signal processing used for image reconstruction according to the invention;

FIG. 4A, a schematic illustration of a multi-band interferometric radiometer according to an exemplary embodiment of the invention;

FIG. 4B, a magnified view of the central part of the interferometric radiometer of FIG. 4A; and FIG. 5, a block diagram illustrating the principle of reversed baseline calibration.

FIG. 1 provides a general view of a space-borne interferometric radiometer according to the invention, used for example for imaging the Earth from a geostationary orbit. The figure also provides a definition of the coordinate system which will be used throughout the following description.

The interferometric radiometer is carried by a three-axis stabilized spacecraft SAT, which can be a standard bus for geostationary telecommunication satellites. It basically comprises a two-dimensional array of receiving elements, REA, which in a preferred embodiment is Y-shaped, means ROT for rotating the REA array around an axis (z) pointed toward the center of the Earth with respect to the non-rotating spacecraft SAT at a rotational speed of the order of 0.1-1 rpm, signal processing means SP1, SP2 and calibration means CM. In order to compensate for the effect that the rotating assembly REA has on the attitude dynamics of the spacecraft SAT, the latter can advantageously be provided with a counter rotating reaction wheel.

The choice of the rotational speed is worth a short discussion. From a mechanical point of view, the rotation should preferably be as slow as possible in order to reduce the forces on the spacecraft and to simplify the moment compensation system. A lower limit for the rotation rate is set by the image repetition rate, since at least half a rotation is required for forming an image. A slightly higher rotation rate is preferred to ensure that the calibration function operates on an image that can be considered stable. Phase and amplitude stability also has to be taken into account: larger drifts require more frequent calibrations, and therefore a faster rotation.

The rotating assembly REA is constituted by three linear arms angularly spaced by 120° with respect to each other so as to form a Y, the rotation axis of the assembly passing near the center of said Y. Each arm carries a number of receiving elements (from about 50 to more than 400, depending on the specific application), each constituted by a receiving antenna and the associated front-end electronics. The antenna is typically a horn-feed or an integrated-lens antenna. The front-end electronics provides amplification, conversion to intermediate frequency and possibly digitization of the received signals.

A detailed description of the geometric arrangement of the receiving elements will be provided later, with reference to FIGS. 4A and 4B.

The radiation emission of the observed scene (e.g. the Earth disc ED) at wavelength $\lambda$ can be measured by its brightness temperature $T_B(\lambda,\xi,\eta)$, where:

$\xi = \sin\theta \cos\phi$ $\eta = \sin\theta \sin\phi$

The spherical coordinates $\theta$ and $\phi$ are defined on FIG. 1; the origin of the coordinate system coincide with the center of the radiometer, the z axis points toward the center of the Earth and the y axis is parallel to the earth rotation axis and points towards south. Angle $\psi$ measures the rotational position of the receiving element array REA in the x-y plane.

The first signal processing means SP1 take as inputs the signals received by the different receiving elements of the interferometric radiometer and compute the so-called visibility function, V. Then, the second signal processing means SP2 take as input said visibility function and reconstruct the brightness temperature distribution $T_B(\lambda,\xi,\eta)$ of the observed Earth disc ED. The reconstructed image is then transmitted to the ground by non-represented communication means.

Calibration means CM are also provided in order to compensate for the drifts of the complex gain of the receiving elements. Without calibration, which has to be performed all along the operational life of the instrument, these drifts would quickly make impossible the retrieval of meaningful images.

The basic principles of interferometric imaging by a stationary receiver, known from prior art, will be now recalled with reference to FIG. 2.

On this figure, circles represent individual receiving elements, which are equally spaced along three arms forming a Y-figure. Let us consider two receiving elements 201 and 202 with individual complex gains $g_{201}$ and $g_{202}$, each receiving elements being identified by its coordinates $(x_i, y_i, z_i=0)$, i=201,202. We define the "baseline", or distance vector, (u,v) as follows:

$$u = \frac{\Delta x}{\lambda} = \frac{x_{202} - x_{201}}{\lambda}, v = \frac{\Delta y}{\lambda} = \frac{y_{202} - y_{201}}{\lambda}$$

The visibility function is defined as the complex cross-correlation of the signals received by any pair of receiving elements, expressed as a function of the corresponding baseline (u,v):

$$V(u,v) = \frac{1}{4\pi} \int_{-1}^{1} \int_{-1}^{1} G(\xi,\eta) T_B(\xi,\eta) e^{j2\pi(u\xi+v\eta)} \frac{d\xi d\eta}{\sqrt{1-\xi^2-\eta^2}} \quad [2]$$

For the sake of simplicity, in equation 2 it has been supposed that the complex gain of all the receiving element is the same and the (real) gain $G(\xi,\eta)$ as been defined as $G(\xi,\eta) = g_{201}(\xi,\eta) \cdot g^*_{202}(\xi,\eta)$. Moreover, the dependence of V, $T_B$ and G from the wavelength $\lambda$ has been omitted.

Apart from the antenna gains, equation [2] shows that the visibility function is basically the Fourier transform of the brightness temperature of the observed scene, u and v representing spatial frequencies. Since $T_B(\xi,\eta)$ takes real values, the visibility V(u,v) is hermitian, i.e. $V(-u,-v)=V^*(u,v)$, where "*" represents the complex conjugate operator.

From a measurement of the visibility in the u-v plane (a two-dimensional spatial frequency domain), it is possible to reconstruct the spatial distribution of the temperature brightness of the observed scene by simply taking the inverse Fourier transform:

$$\hat{T}_B(\xi,\eta) = \qquad [3]$$
$$4\pi \frac{\sqrt{1-\xi^2-\eta^2}}{G(\xi,\eta)} \int_{-\infty}^{\infty}\int_{-\infty}^{\infty} w(\sqrt{u^2+v^2})\hat{V}(u,v)e^{-j2\pi(u\xi+v\eta)} du\, dv$$

where $w(\sqrt{u^2+v^2})$ is a weighting function, normalized such that w(0)=1, which is used to reduce the sidelobes that result from the truncation of the visibility function at the maximum baseline length. A suitable choice is a Gaussian weighting function: $w(\rho)=e^{-\rho^2/\rho_0^2}$, where $\rho=\sqrt{u^2+v^2}$. The scaling factor $\rho_0$ is usually chosen to be of about 60-70% of the maximum baseline length, which ensures that the Gaussian weighting function has dropped to below 0.1 at the maximum baseline length.

On FIG. 2, dots represent the baselines associated to each pair of receiving elements. For example, the dot indicated by the reference (u,v) correspond to the baseline oriented from element 201 to element 202, while (–u,–v) is the reversed baseline, oriented from element 202 to element 201. In principle, for an array of N receivers, N·(N–1) baselines are formed (including reversed baselines); in practice, however, there is a high redundancy, which means that many of said baselines coincide; as a consequence, the actual number of independent baselines is significantly smaller. FIG. 2 shows that a Y-shaped array of equally spaced receiving elements produces a regular hexagonal lattice of baselines in the u-v plane. Computing the cross-correlation for all the available pairs of receiving elements (equation [2]) yield the visibility function V(u,v) of the observed scene, sampled in the u-v plane by said baseline lattice.

The spatial resolution of the reconstructed brightness temperature distribution $\hat{T}_B(\xi,\eta)$ is determined by the maximum baseline length $\rho_{max}=\max(\sqrt{u^2+v^2})$, see equation [1]. More precisely, resolution is ultimately determined by the scaling factor $\rho_0$ of the weighting function $w(\rho)$ used for image reconstruction, which in turn is chosen to be proportional to $\rho_{max}$. Moreover, it is known from sampling theory that, in order to avoid aliasing, the sampling of the visibility function must be dense enough to satisfy the Nyquist criterion for an unambiguous field of view covering the whole Earth disc. For observation from a GEO orbit:

$$d_{sampling} \leq \frac{R_{GEO}}{2R_{Earth}}\lambda \approx 3.3\lambda \qquad [4]$$

where $R_{GEO}$ is the radius of a geostationary orbit, $R_{Earth}$ is the radius of the Earth and $d_{sampling}$ the maximum distance between neighboring points of the lattice of baselines. As discussed above, equation [4] determines the maximum allowed spacing of individual receiving elements in the Y-shaped array of FIG. 2. This criterion, combined with the resolution requirements which set the size of the array, almost univocally determines the number of receiving elements.

It is now possible to understand why, until now, it has been impossible to image the Earth in the millimeter wavelengths from a GEO orbit with a satisfactory spatial resolution. From equation [1], it appears that in order to achieve a spatial resolution of the order of 30 km, corresponding to an angular resolution of about 1 milliradian, at 50 GHZ a maximum baseline $\rho_{max}$ of about 8 m is required; taking into account the Y geometry of the array REA, this leads to arms having a length of about 4 m. The Nyquist sampling criterion leads, through equation [4], to a total number of receivers of about 630. It is very difficult to build such a complex instrument, to place it on a GEO orbit and to calibrate it in order to obtain meaningful images.

The idea at the basis of the invention is that rotating the receiving element array REA and adding-up the samples of the visibility function corresponding to different rotational positions allows a dramatic reduction of the number of receiving elements, and therefore of the complexity, mass, power consumption and calibration requirements of the radiometer. Moreover, the invention also provides other significant advantages which will be discussed here below.

If one tried to reduce the number of receiving elements in a stationary, Y-shaped interferometric radiometer by simply increasing the inter-element spacing, the corresponding baseline lattice in the u-v plane would maintain the same hexagonal geometry, but have a much lower sampling density. As discussed above, the insufficient sampling of the visibility function would induce strong aliasing errors in the reconstructed brightness temperature distribution, making it almost useless.

It is here that rotation of the receiving element array comes into play. According to the invention, said array is rotated about the z-axis and "snapshots" of the visibility function are acquired at regular intervals during half a rotation. Each snapshot samples the visibility function of the observed scene with a rotated version of the sparse lattice of baselines. Adding up the sets of samples corresponding to each rotational position, a dense sampling of V(u,v) over a circular lattice of baseline is obtained. Reconstruction of the brightness temperature distribution is then possible after a half-rotation (a full rotation is not needed because of the hermitian symmetry of the visibility function).

Of course, in order to avoid aliasing, the composite sampling of the u-v plane needs satisfying the Nyquist criterion, even if the individual snapshots do not. This is obtained by ensuring that the baseline lattice corresponding to each snapshot does not contain "radial gaps" wider than the Nyquist limit expressed by equation [4].

Up to now, only the case of strictly monochromatic incident radiation has been considered. In reality, the receiving elements have a finite bandwidth and frequency selectivity within this bandwidth is a highly desirable feature. This frequency selectivity can be obtained by measuring cross-correlations between receiving elements for a number of time lags $\tau$.

As shown on FIG. 3, cross correlation "snapshots" ISV, corresponding to different rotational positions of the array and to different time lags $\tau$, fills a three-dimensional u-v-$\tau$ sampling space with a three-dimensional lattice of sampling points TDS having a cylindrical geometry.

Frequency selectivity is performed by Fourier-transforming (FT on FIG. 3) the cross-correlation measurements with respect to $\tau$, in the same way as two-dimensional Fourier transform with respect to u and v provides spatial resolution.

As a result, the samples of the visibility function are converted to high-resolution multispectral images MI of the Earth disc.

Frequency resolution is usually not enough: many applications also need the possibility of discriminating between vertical and horizontal polarization components (with respect to the ground surface) of the received radiation. Experience shows that the brightness temperature distribution can be very different for these two polarization components.

In non-rotating instruments, independent measurement of two orthogonal polarization components is relatively straightforward. In the case of the present invention, however, rotation of the array of receiving elements introduces a complication: the polarization rotation of each antenna rotates together with the interferometer and a combination of X and Y polarizations is obtained. This problem can be solved by using antennas having a common set of orthogonal polarization axis and by cross-correlating the corresponding orthogonally polarized signals to find the Stokes parameter. It is advantageous to use, for the polarization axis, the antenna-fixed XA and YA directions; the Stokes parameters are then given by:

$$I_A = \langle E_{XA} E^*_{XA} \rangle + \langle E_{YA} E^*_{YA} \rangle$$

$$Q_A = \langle E_{XA} E^*_{XA} \rangle - \langle E_{YA} E^*_{YA} \rangle$$

$$U_A = \langle E_{XA} E^*_{YA} \rangle + \langle E^*_{XA} E_{YA} \rangle$$

$$V_A = j \langle E_{XA} E^*_{YA} \rangle - j \langle E^*_{XA} E_{YA} \rangle \quad [5]$$

where j is the imaginary unit and $E_{XA,YA}$ are the electric field components with XA- and YA-polarization respectively.

Conversion to the x,y satellite-fixed reference frame is then a simple change of coordinates:

$$I_S = I_A$$

$$Q_S = Q_A \cos 2\phi - U_A \sin 2\phi$$

$$U_S = -Q_A \sin 2\phi + U_A \cos 2\phi$$

$$V_S = V_A \quad [6]$$

Another change of coordinates yields the required vertical and horizontal polarization components.

It should be noted that physical considerations let suppose that, for Earth observation $V_S = V_A \approx 0$, because scattering in the atmosphere or on the Earth surface only generates unpolarized or linearly polarized waves. Hence $\langle E_{XA} E^*_{YA} \rangle \approx \langle E^*_{XA} E_{YA} \rangle$ and therefore only one of them needs to be computed.

As discussed above, contrarily to the case of a stationary interferometric radiometer, in the instrument of the invention the number of receiving elements (and therefore of cross-correlators in the first signal processing means) is not univocally determined by the combination of the spatial resolution requirements and the Nyquist sampling criterion. In practice, the required sensitivity and image update time set the minimum acceptable number of receiving elements of an instrument according to the invention. Sensitivity is expressed in terms of the noise-equivalent temperature (NeΔT or NeDT), quantifying the smallest brightness temperature difference that can be measured, and usually defined as the standard deviation of 100 consecutive estimates of a fixed scene brightness temperature of, say, 300 K. It can be shown that the sensitivity increases (and therefore NeΔT decreases) for an increasing number of receiving elements (and therefore correlator) and for an increasing image update time, which determines the maximum integration time. With a Gaussian weighting function, it has been found that, the optimum distribution of the integration time $\tau_{int}$ over the u-v plane is proportional to the weighting function, i.e.

$$\tau_{int}(\rho) = \tau_0 e^{-\rho^2/\rho_0^2} \text{ with } \tau_0 = 2 N_{corr} \tau_{image} \frac{\Delta u \Delta v}{\pi \rho_0^2}.$$

With this distribution, $$Ne\Delta T(\theta) \approx \frac{4\pi}{G(\theta)} \frac{T_{sys} \pi \rho_0^2}{\eta_c \sqrt{2 N_{corr} B \tau_{image}}} \quad [7]$$

where:

$G(\theta)$ is the receiving element gain, supposed independent on $\phi$ and the same for all pairs of elements;

$T_{sys}$ is the noise temperature of the system;

$N_{corr}$ is the number of correlators (i.e. the number of baselines pairs for which the visibility function is computed);

$\eta_c$ is the efficiency of the correlators, including analog-to-digital conversion losses;

B is the measurement bandwidth of the complex signal;

$\tau_{image}$ is the image update time; $\rho_0$ is a scaling parameter of the weighting function $w(\rho)$, assumed to be Gaussian: $w(\rho) = e^{-\rho^2/\rho_0^2}$ and and $\Delta u$, $\Delta v$ are the sampling steps in the u-v plane.

Equation [7] can be generalized to an arbitrary weighting function and a non-uniform sampling of the u-v plane.

The freedom, for the instrument designer, to determine the number of receiving elements on the basis of the sensitivity and update time requirements is a unique feature of the invention: as already discussed, in the case of a non-rotating instrument, this number is univocally determined by the spatial resolution and sampling requirements.

It is now possible to quantify the reduction in the number of receiving elements which can be obtained thanks to the invention. Current meteorological knowledge suggests that a minimum requirement is 200 km (about 7 mrad) resolution with an image update time of 12 h and a NeΔT of 1.5K at 53 GHz. More satisfactory requirements are a resolution of 30 km (about 1 mrad), an image update time of 30 minutes and a NeΔT of 0.5K. These requirements are met by a rotating interferometric radiometer comprising 140 elements, compared to the 630 elements which would be necessary using a non-rotating instrument, i.e. a reduction of about 77%.

This dramatic reduction of the complexity, and therefore of the mass, of the radiometer makes possible the realization of a multi-band instrument, operating in several frequency band in the 30-400 GHz spectral range (this range is illustrative and not limitative). A multi-band instrument is simply constituted by a plurality of individual radiometers according to the invention, mounted on a common rotating structure.

In particular, for meteorological application it would be desirable to take images in several separate bands: 50-56 GHz (for the sake of simplicity, "53 GHz band"), 118.45-123.25 GHz ("118 GHz") 166-188.31 GHz ("183 GHz") and 346-380.20 GHz ("380 GHz"), etc. Measurements in the 53 and 183 GHz band allow determination of the temperature and of the water vapor concentration, which represent the highest priority; measurements at 118 GHz would add capability to discriminate between clouds and precipitation while at 380

GHz would allow a better coverage of water vapor concentration at high altitude and discrimination between precipitation and cirrus clouds.

The following table shows the number of receiving elements in an exemplary embodiment of a four-band radiometer according to the invention, and a comparison with the number of elements which would be required in a non-rotating radiometer with similar performances:

| Band | Rotating Y-shaped array | | Stationary Y-shaped array Number of elements |
|---|---|---|---|
| | Number of elements | NeΔT at 30 minutes | |
| 53 GHz | 136 | 0.5 K | 630 |
| 118 GHz | 107 | 1.0 K | 630 |
| 183 GHz | 107 | 1.1 K | 630 |
| 380 GHz | 107 | 2.6 K | 630 |
| Total number of elements | 457 | | 2520 |

It can be seen that the number of receiving elements required for the four-band radiometer according to the exemplary embodiment of the invention is less than that which would be necessary for a non-rotating radiometer working in a single band. The number of elements could be further reduced by making the sensitivity requirements less stringent.

FIG. 4A shows a view from the nadir of the rotating assembly of a multi-band interferometric radiometer according to an exemplary embodiment of the invention. The instrument comprises a Y-shaped support structure STR constituted by three arms A1, A2 and A3 extending in a radial direction and angularly spaced by 120°. The support structure can be rotated around an axis passing through its center and it carries four individual Y-shaped receiving element arrays REA, each adapted for receiving radiation in a different band: REA-53 operates in the "53 GHz" band, REA-118 in the "118 GHz" band, REA-183 in the "183 GHz" band and REA-380 in the "380 GHz" band.

More precisely, each array of receiving elements comprises three linear sub-arrays extending along the arms of the support structure STR. The linear sub-arrays of different individual interferometric radiometers which extend along the same arm of the support structure are parallel to each other.

It can be observed that only the lowest-frequency array of receiving elements extends over the whole length of the arms, and that the length of the arrays decreases for increasing frequency: this is a consequence of the fact that the baseline length required for achieving a same spatial resolution is proportional to the radiation wavelength, as it results from equation 1.

FIG. 4B shows an expanded view of the central part of FIG. 4A, and allows appreciating the arrangement of the individual receiving elements within each linear array. First of all, it can be seen that the distance between elements is not constant; a general trend is that elements are more closely spaced toward the center of the interferometer, and their density is reduced toward the outer end. The arrangements of the receiving elements on arms A1, A2 and A3 are identical, except for the fact that the 53 GHz array on arm A3 is displaced from the center by approximately 0.4 m in order to make room for the 380 GHz array. The outermost elements of this arm are therefore removed such that the physical lengths of all arms are equal.

The outer part of the arms has a repeating pattern for the element spacing, e.g. 12λ-19λ at 53 GHz, up to the end of the array.

It is clear from FIG. 4B that multi-band operation is only possible because the invention makes a closed-packed arrangement of the receiving elements unnecessary; otherwise, the array corresponding to a single band would completely occupy the center of the instrument, and there would not be place for the other arrays.

Determining the exact layout of the receiving elements of the interferometric radiometer is a matter of optimization and depends on the specific target performances. Several considerations have to be taken into account:

First of all, as already discussed, the required spatial resolution determines the maximum baseline length, and the Nyquist criterion determines the required density of samples in the u-v plane (after rotation of the interferometer).

The overall number of receivers is determined by the required sensitivity. A tradeoff is often necessary between the complexity of the instrument, its sensitivity and its time resolution: in order to increase the sensitivity it is necessary to increase the integration time, and therefore to worsen the time resolution, or to increase the number of receiving elements, or both.

Thanks to the use of rotational sampling, the receiving elements do not need to be mounted edge-to-edge. This allows the instrument designer to tailor the density distribution of the baseline lengths $\rho=\sqrt{u^2+v^2}$ in order to improve the performances. In prior art, use of a constant inter-element spacing leads to an almost uniform density distribution of the baseline lengths, up to a maximum value $\rho_{max}$, where the density falls to zero. This corresponds to the synthesis of a "hard" aperture, which is intrinsically affected by strong diffraction sidelobes, which have to be suppressed by appropriate signal processing On the contrary, in the case of an advantageous embodiment of the invention, the receiving elements are not equidistant, nor are their relative distances expressed by integer multiples of a minimum baseline. This allows achieving a density distribution of the baseline lengths which goes smoothly to zero, reducing or suppressing the sidelobes. A Gaussian distribution is often considered as an optimum, but other suitable apodization functions, such as cosine, Hamming, Hanning, etc. can be used. In practice, anyway, the desired apodization function can only be approximated.

A careful design of the arrangement of the receiving elements can lead to a relative amplitude of the sidelobes not exceeding −20 dB, and preferably −40 dB. Ideally, the distribution of baselines should be matched to the weighting function $w(\rho)$ used for the retrieval of the brightness temperature distribution (equation [3]).

As it will be discussed below, for calibration it is advantageous to use an almost identical element configuration on the three arms.

Calibration is a very important step in imaging interferometry, because receiving elements experience amplitude and, most importantly, phase drifts which would rapidly make the brightness temperature distribution retrieval impossible if they were not corrected. The inventors have found that rotation of the array of receiving elements helps calibrating the instrument. In fact, since the array rotates perpendicular to the u-v plane that is scanned, the same baseline appears with inversed sign for each half turn. At a rotation rate of the order of 1 rpm, the observed scene can be considered constant and therefore the inversion of the baselines transforms the visibility function into its complex conjugate. Otherwise stated, if ψ if the rotation angle of the array, $V(u,v; \psi \pm 180°)=V(-u,-v; \psi)=V^*(u,v; \psi)$. As it will be seen below, this can be used for phase and delay calibration of the receiving elements. Moreover, in the particular case of a Y-shaped array with identical arms, a 120° turn let the interferometric configuration unchanged, i.e. V(u,v; ψ±120°)=V(u, v; ψ), and this is also useful for calibration. By combining the relations above, one obtains:

$$V(u,v;\psi\pm60°)=V(u,v;\psi\pm180°)=V^*(u,v;\psi)$$

$$V(u,v;\psi\pm120°)=V(u,v;\psi)$$

i.e. each 60° rotation brings useful calibration information.

The idea at the root of reversed baseline calibrations is that two measurements from opposite oriented arrays of receivers measure the same information with opposite phase errors, which can then be averaged out.

A more precise description of this calibration technique will now be carried out with reference to FIG. 5. This figure shows a simplified block diagram of an individual interferometer constituted by a couple of receiving elements A and B, the associated front-end electronics including amplifiers (FEA-A and FEA-B), IF mixers (MA, MB) for frequency down-conversion, linked to a local oscillator LO, and a correlator CORR.

The left and right parts of FIG. 5 correspond to opposed orientations of the A-B baseline, i.e. to rotational positions of the Y-shaped array differing by 180°. The signal received by the A (B, respectively) antenna undergoes amplification by a factor $G_A e^{j\phi_A}$ ($G_B e^{j\phi_B}$), then it is mixed with a locally generated sinusoidal signal oscillating at a frequency $\omega_{LO}$, with an insertion phase $\phi_{LO,A}$ ($\phi_{LO,B}$).

Let $V_{C\_0}$ and $V_{C\_180}$ be the correlation measurements across the baseline at 0° and 180° interferometer rotation angle. Then, from inspection of FIG. 5:

$$V_{C\_0}=S_A S^*_B=S_1 S^*_2 \cdot G_A G_B \cdot e^{j(\phi_A-\phi_B+\phi_{LO,A}-\phi_{LO,B})}$$

$$V^*_{C\_180}=S^*_A S_B=S_1 S^*_2 \cdot G_A G_B \cdot e^{-j(\phi_A-\phi_B+\phi_{LO,A}-\phi_{LO,B})} \quad [8]$$

Hence the combined phase bias of the receiving channels can be determined from the argument of the ratio between the correlation measurements at opposite interferometer orientations, i.e.

$$\frac{V_{C\_0}}{V^*_{C\_180}} = e^{j2(\varphi_A-\varphi_B+\varphi_{LO,A}-\varphi_{LO,B})} \quad [9]$$

Equation [9] demonstrates how the rotation of the interferometer will contribute with sets of redundant information.

The rotation further provides additional redundant information that will aid the calibration: consider two elements (A and B) positioned along one arm of the rotating Y and two others elements (C and D) positioned along another arm. Let the separation between elements A and B be identical to the separation between C and D. Then, due to the discrete rotational symmetry of the Y-shaped array REA, the baseline between A and B will be identical to the baseline between D and C after a 60° interferometer rotation, hence:

$$V_{C\_0}=S_1 S^*_2 \cdot G_A G_B \cdot e^{j(\phi_A-\phi_B+\phi_{LO,A}-\phi_{LO,B})}$$

$$V^*_{C\_60}=S_1 S^*_2 \cdot G_D G_C \cdot e^{j(\phi_D-\phi_C+\phi_{LO,D}-\phi_{LO,C})} \quad [10]$$

The ratio between the two observations in equation [10] provide a scene independent observation of the combined gain and phase biases of the receivers involved in the two measurements. Similar ratios can be written for all element combinations with common element separations along the arms and the equations can be formulated for each rotation of an integer multiple of 60°, i.e.

$$\frac{V_{C\_0}}{V^*_{C\_n*60}} = \frac{G_A G_B}{G_C G_D} e^{j(\varphi_A-\varphi_B+\varphi_C-\varphi_D+\varphi_{LO,A}-\varphi_{LO,B}+\varphi_{LO,C}-\varphi_{LO,D})} \quad [11]$$

where $V_{C\_n*60}$ indicates that equations can be formulated for each rotation of an integer multiple of 60°.

It is noted that equation [9] is a special case of equation [11], i.e. after 180° rotation $G_A=G_C$, $\phi_B=\phi_D$ etc. Hence equation [11] describes the complete set of redundant information that is added due to the rotation.

The element layout of the interferometer will also include instantaneously redundant baselines where ratios similar to equation [11] can be formed without rotation.

Equation [11] can not be solved independently for a single set of receivers, but when all equations similar to [11] are combined, a well conditioned matrix solution that solves the relative gain and phase biases for each individual receiver can be formed. This solution will benefit from redundancies originating from both the rotation as well as instantaneously available redundancies.

The description provided above is a principal description that demonstrates how additional redundancies are provided due to the rotation. These redundancies will aid the matrix solution of the relative amplitude and phase calibration coefficients. The formulation of this solution can be based on prior art, such as redundant space calibration reported in the doctoral thesis of A. J. Camps Carmona "Application of Interferometric Radiometry to Earth Observation", Universitat Politècnica de Catalunya, Barcelona, Spain, 1996.

Relative phase and amplitude calibrations can be performed separately in each resolution channel in order to retrieve frequency-dependent variations. These calibrations need to be supplemented by an absolute radiometric calibration.

Absolute radiometric calibration can be provided by a separate system that provides absolute calibration for a known part of the observed image. The image retrieved by the interferometric radiometer can then be calibrated by scaling the interferometric image such that the intensity over the commonly observed portion of the image are aliened for two observation systems.

Note that the fact that, in the embodiments of FIGS. 4A and 4B, the three arms are not rigorously identical is not prejudicial to calibration. The patterns of baselines along the three arms are very similar and a large number of equations similar to [11] that include all elements can be formed.

The invention has been described with reference to a few exemplary embodiments. However, the person skilled in the art will understand that a number of modifications can be considered without departing from the scope of the invention.

The Y-shape of the array is often considered to be optimal for imaging Interferometry, but it is not exclusive. Other shapes, such as T, L, V, or a circle are also well suited for carrying out the invention.

The array can also comprise non-linear, e.g. curved, arms.

Moreover, the array of receiving elements need not be strictly speaking two-dimensional: the receiving elements need not lye in the same plane, provided a phase correction is included to take into account the path differences introduced by a three-dimensional arrangement. For this reason, the array REA can be broadly defined as "two- or three-dimensional".

Moreover it is not necessary that all the receiving elements are aligned along linear arms: on the contrary, a few non-aligned elements can have a beneficial effect. In particular, a triangular arrangement of elements, with common baselines on each arm, is an interesting embodiment, since it strengthens the instantaneous redundancy between arms.

From a purely interferometric point of view, it is not necessary to rotate the array of receiving element around its center. However, in practice, it is advantageous to balance the mass and momentums around the axis, by making it pass through the center of inertia of the array, in order to obtain a stable instrument.

Throughout the preceding description, it has been implicitly assumed that the antennas of all the receiving elements working in the same frequency band have the same diameter. This is not necessary: since rotation of the array makes a close-packed arrangement unnecessary, there is room in the array for receiving elements of different size. In particular, it is possible to use larger antennas in the outer part of the array than in the inner part, where the convergence of the arms induces encumbrance constraints.

The use of delayed cross-correlations and Fourier transforms with respect to the delay in order to achieve spectral selectivity is advantageous compared to systems with analog pre-correlation selectivity filters, where uncalibrated, mismatched filters would introduce biases in the brightness temperature measurements. However, the Fourier-transform technique is more power-consuming than analog filtering; therefore in some applications the latter, or a combination of the two techniques, could be preferred.

Finally, it is not necessary for all the signal processing means for image retrieval to be embarked on the satellite, as suggested by FIG. 2. An alternative embodiment, for example, would embark on the satellite only the first signal processing means and the calibration means and transmit the visibility samples $V(u,v,\tau)$ to the ground for further processing.

The invention claimed is:

1. An interferometric radiometer for imaging a target scene (ED), comprising:
   a plurality of receiving elements (201, 202) for receiving said radiation, said receiving elements (201, 202) being arranged in a two- or three-dimensional array (REA);
   first signal processing means (SP1) for computing a two-dimensional set of samples of a visibility function (V) of said radiation emission by pair-wise cross-correlating signals received by said receiving elements (201, 202); and
   second signal processing means (SP2) for reconstructing an intensity image (MI) of said radiation emission from said samples of said visibility function (V);
   characterized in that it further comprises means (ROT) for rotating said two- or three-dimensional array of receiving elements (REA) about a rotation axis (z) which is substantially directed toward said target scene (ED);
   and in that said second signal processing means (SP2) are adapted for reconstructing said intensity image (MI) from a plurality of two-dimensional sets of samples of said visibility function (V), each of said set of samples corresponding to a different rotational position of said rotating two- or three-dimensional array (REA) of receiving elements.

2. A space-borne interferometric radiometer according to claim 1, adapted for imaging a planetary surface (ED).

3. An interferometric radiometer according to claim 1, wherein said array of receiving elements (REA) is substantially bi-dimensional and perpendicular to said rotation axis (z).

4. An interferometric radiometer according to claim 1, wherein the spacings between said receiving elements (201, 202) are not constant, nor are integer multiples of a minimum spacing.

5. An interferometric radiometer according to claim 4, wherein the arrangement of said receiving elements (201, 202) is chosen to determine a non-uniform distribution of said samples of said visibility function (V) in a two-dimensional spatial frequency domain, ensuring that the secondary lobes of a synthesized receiving pattern of said interferometric radiometer have a normalized amplitude of −20 dB or less.

6. An interferometric radiometer according to claim 4, wherein the arrangement of said receiving elements (201, 202) is such that the distribution of said samples of said visibility function (V) in a two-dimensional spatial frequency domain approaches an apodization function chosen between a Gaussian function, a cosine, a Hamming window and a Hanning window.

7. An interferometric radiometer according to claim 1, wherein said means (ROT) for rotating said two or three-dimensional array (REA) are adapted for operating at a rotational speed comprised between 0.001 and 100 rpm, preferably between 0.01 and 10 rpm.

8. An interferometric radiometer according to claim 1, wherein said receiving elements (201, 202) are adapted for receiving electromagnetic radiation in at least a frequency band lying in the 1 GHz-1 THz spectral range.

9. An interferometric radiometer according to claim 8, wherein said receiving elements (201, 202) are adapted for receiving electromagnetic radiation in at least a frequency band lying in the 30 GHz-400 GHz spectral range.

10. An interferometric radiometer according to claim 8, wherein the width of said two- or three-dimensional array (REA) of receiving elements perpendicularly to said rotation axis (z) is sufficient for providing an angular resolution of the reconstructed intensity image of 7 milliradians or less at least in said frequency band.

11. An interferometric radiometer according to claim 8, wherein the number and the arrangement of said receiving elements (201, 202) are such that, after half a turn of the rotating two- or three-dimensional array (REA), the resulting sampling density of said visibility function (V) is sufficient for providing an unambiguous field of view having a full width of 17° or more, at least in said frequency band.

12. An interferometric radiometer according to claim 1, wherein said rotation axis (z) passes substantially through the center of inertia of said rotating two- or three-dimensional array of receiving elements (REA).

13. An interferometric radiometer according to claim 1, wherein said receiving elements (201, 202) are aligned along a plurality of linear arms (A1, A2, A3).

14. An interferometric radiometer according to claim 13, wherein said receiving elements (201, 202) are aligned along three linear arms (A1, A2, A3) angularly spaced by 120° with respect to each other so as to form a Y-shaped array (REA), said rotation axis (z) passing through the center of said array.

15. An interferometric radiometer according to claim 13, wherein the number and the spacing of the receiving elements (201, 202) on said linear arms (A1, A2, A3) are the same.

16. An interferometric radiometer according to claim 1, wherein said first signal processing means (SP1) are adapted for introducing a plurality of relative time delays ($\tau$) between said received signals to be cross-correlated and for computing delay-dependent visibility functions (V), and said second signal processing means (SP2) are adapted for reconstructing a multi-spectral image (MI) of said radiation emission by Fourier-transforming said delay-dependent visibility functions.

17. An interferometric radiometer according to claim 1, further comprising relative phase calibration means (CM), wherein said calibration means (CM) are adapted for comparing the sets of samples of said visibility function (V) corresponding to different rotational positions of said rotating array of receiving elements (REA) and retrieving relative phase calibration information by said comparison.

18. An interferometric radiometer according to claim 1, further comprising relative amplitude calibration means (CM), wherein said calibration means (CM) are adapted for comparing the sets of samples of said visibility function (V) corresponding to different rotational positions of said rotating array of receiving elements (REA) and retrieving relative amplitude calibration information by said comparison.

19. An interferometric radiometer according to claim 17, wherein said calibration means (CM) are adapted for comparing the sets of samples of said visibility function (V) corresponding to rotational positions of said rotating array of receiving elements (REA) differing by half a turn.

20. An interferometric radiometer according to claim 17, wherein said rotating array of receiving elements (REA) has, at least approximately, a discrete rotational symmetry, and wherein said calibration means (CM) are adapted for comparing the sets of samples of said visibility function (V) corresponding to rotational positions of said rotating array of receiving elements (REA) differing by an angle corresponding to said discrete rotational symmetry.

21. An interferometric radiometer according to claim 1, wherein the receiving elements (201, 202) are adapted for distinguishing between two polarization components of the received radiation, and wherein said second signal processing means (SP2) are adapted for reconstructing two intensity images corresponding to different polarization components of said radiation emission.

22. An interferometric radiometer according to claim 21, wherein said second signal processing means (SP2) are adapted for computing the Stokes parameters of the received radiation.

23. A multi-band interferometric radiometer comprising a plurality of individual interferometric radiometers according to claim 1, the two- or three-dimensional arrays of receiving elements of which (REA-53, REA-118,) REA-153, REA-380) are mounted on a common rotating structure (STR), each of said individual interferometric radiometers being adapted to operate in a different spectral band.

24. A multi-band interferometric radiometer according to claim 23, comprising a plurality of individual interferometric radiometers wherein said receiving elements (201, 202) are aligned along a plurality of linear arms (A1,A2, A3), and wherein the corresponding linear arms (A1, A2, A3) of said individual interferometric radiometers are parallel to each other.

25. An interferometric radiometer according to claim 5, wherein the secondary lobes of a synthesized receiving pattern of said interferometric radiometer have a normalized amplitude of −40 dB or less.

26. An interferometric radiometer according to claim 7, wherein said means (ROT) for rotating said two or three-dimensional array (REA) are adapted for operating at a rotational speed comprised between 0.01 and 10 rpm.

27. An interferometric radiometer according to claim 10, wherein the width of said two- or three-dimensional array (REA) of receiving elements perpendicularly to said rotation axis (z) is sufficient for providing an angular resolution of the reconstructed intensity image of 1 milliradians or less at least in said frequency band.

* * * * *